United States Patent [19]
Dunnigan

[11] Patent Number: 5,727,773
[45] Date of Patent: Mar. 17, 1998

[54] ADJUSTABLE FLUID VALVE ASSEMBLY

[75] Inventor: Dennis C. Dunnigan, Orion Township, Mich.

[73] Assignee: International Flow Technology, Inc., Warren, Mich.

[21] Appl. No.: 747,167

[22] Filed: Nov. 8, 1996

[51] Int. Cl.⁶ .................................................. F16K 31/50
[52] U.S. Cl. ........................... 251/325; 251/205; 251/284
[58] Field of Search ............................... 251/205, 208, 251/903, 215, 325, 284, 324; 137/903; 285/272

[56] References Cited

U.S. PATENT DOCUMENTS

| | | | |
|---|---|---|---|
| 1,536,630 | 5/1925 | Reinecke | 251/325 X |
| 2,906,492 | 9/1959 | Conrad | 251/325 |
| 3,339,946 | 9/1967 | Kreidel, Sr. et al. | 285/272 |
| 4,977,919 | 12/1990 | Feild | 251/205 |

*Primary Examiner*—Kevin Lee
*Attorney, Agent, or Firm*—Harness, Dickey & Pierce, P.L.C.

[57] ABSTRACT

An adjustable fluid valve assembly includes a body that is operable to receive a spool that can be adjusted to vary the flow rate of the valve assembly. A lock nut secures the spool to the body and maintains the flow rate during operation of the valve assembly. The spool has a plurality of radially extending passages that allows fluid to be evenly distributed around the perimeter of the spool in a balanced manner in order to deliver a smooth continuous flow of fluid to an internal passage of the spool. An alternative embodiment employs a swivel fitting connected to the spool to allow adjustment of the fluid flow without disturbing the piping connected to the valve assembly.

20 Claims, 2 Drawing Sheets

ADJUSTABLE FLUID VALVE ASSEMBLY

BACKGROUND OF THE INVENTION

1. Field of the Invention

The present invention relates generally to fluid valves, more particularly, to an infinitely adjustable fluid valve that can be inserted within a fluid line in an industrial setting for controlling the flow of fluid to a machine apparatus.

2. Description of the Background Art

Fluid valves are commonly used in industrial applications to control the flow of fluid to and from machinery, for example, machine tools where coolants and hydraulic fluids are used. Conventional fluid control valves include, but are not limited to, the needle type fluid valve and the drilled fixed orifice type fluid valve. The needle type valve generally includes a valve body having an adjustable needle member inserted therein for varying the flow of fluid out of the valve body. Conventional problems with needle valves include whistling noises that are generated by the turbulent flow of the fluid as it travels within the valve body. Further, needle type valves do not offer the fine adjustment for fluid flow rate control that is often needed for certain machine tool applications. Also, the flow rate of a needle valve is often too low because of the turbulent flow generated by the fluid racing around the needle within the valve body. The turbulent flow has a tendency of increasing vibration in high pressure applications which is not desirable. Metallic decay can also occur due to high fluid velocities. Finally, the operating range of needle type valves is limited and thus, not desirable in certain industrial applications.

The drilled fixed orifice type valve includes inserting a plug within a fluid line. The plug has a predetermined fixed orifice that allows fluid to flow therethrough. The problem with this type of fluid valve is that it has a fixed flow rate which can only be changed by an operator inserting a new plug with a different orifice size within the fluid line. This of course causes unnecessary down time. Further, the drilled fixed orifice type valve results, during operation, in a turbulent flow which causes unnecessary noise and vibration. Also, obtaining a specific flow rate is very difficult given this design. Moreover, metallic decay can also occur due to high fluid velocities.

Therefore, there is a need to provide an infinitely adjustable fluid valve that provides a broad flow range, ease of adjustability, yet produces laminar flow at a reduced noise level. The adjustable valve should be balanced in order to minimize or even eliminate turbulent flow, yet be capable of operating in high pressure, high fluid velocity and high fluid volume environments. There also is a need for an adjustable fluid valve that is simple to adjust, yet will maintain its adjustment even in high vibration applications. Also, the adjustable valve should be resistant to corrosive fluids and be reliable in industrial applications. Finally, the adjustable valve should be able to be adjusted without disturbing the piping that is connected to the valve.

SUMMARY OF THE INVENTION

It is an object of the present invention to provide an adjustable fluid valve that overcomes the problems associated with conventional fluid valves. Such a fluid valve should be simple in design, quiet during operation, and allow an operator to easily select a flow rate for a particular application.

A first preferred form of the present invention provides a fluid valve assembly having a valve body with an inlet chamber and an outlet chamber. A valve member is positionable within the valve body and has an internal passage with a plurality of radially extending inlet ports. An O-ring is positioned between the valve member and the valve body. A stop is secured to the valve body and has a portion that engages the valve member to prevent the valve member from backing out beyond a safe threaded engagement zone. A lock nut is threaded to the valve member and maintains the adjustment of the valve assembly.

A second preferred form of the present invention includes a valve body, a valve member positioned within the valve body, an O-ring disposed between the valve member and the valve body, a stop, a jam nut, and a swivel connector pivotally connected to the valve member. The swivel connector allows for adjustment of the valve member relative to the valve body without disturbing the piping that the valve assembly is connected to. The swivel connector includes bearing means to effectuate rotation and an elastomeric member in order to prevent leakage of fluids from the valve assembly.

From the following specification taken in conjunction with the accompanying drawings and the dependent claims, other objects, features, and advantages of the present invention will become apparent to those skilled in the art.

DETAILED DESCRIPTION OF THE PREFERRED EMBODIMENTS

Figure 1:
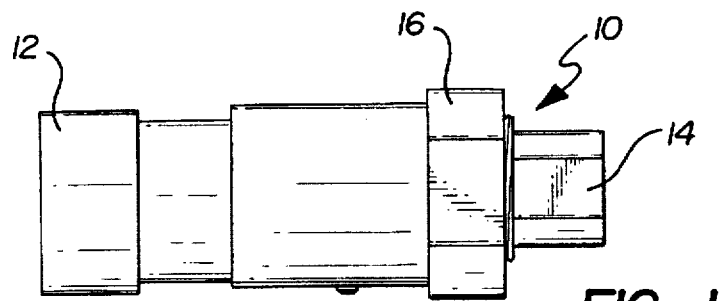
FIG. 1 is a side view of the valve assembly of the present invention.
Figure 2:
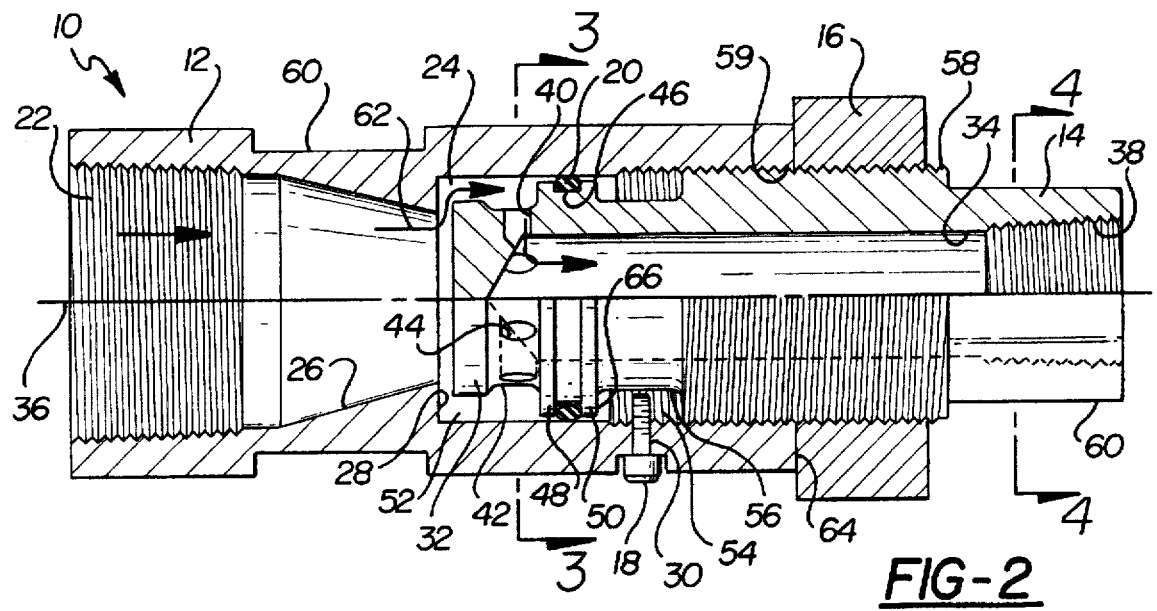
FIG. 2 is a partial sectional view of the side elevation of the valve assembly illustrating its primary components.

FIGS. 1 and 2 depict an infinitely adjustable fluid valve assembly 10 which includes a body 12, a valve member also known as a cartridge or spool 14, a jam nut 16, a stop or set screw 18, and an O-ring 20. Flattened area operable to receive a wrench. The body 12 further has an inlet chamber 22 and an outlet chamber 24. The inlet chamber 22 has a taper 26 that partially defines a shoulder 28 that acts as a stop for the spool 14 to rest against. The body 12 further has a tapped hole 30 for receiving the set screw 18.

Figure 3:
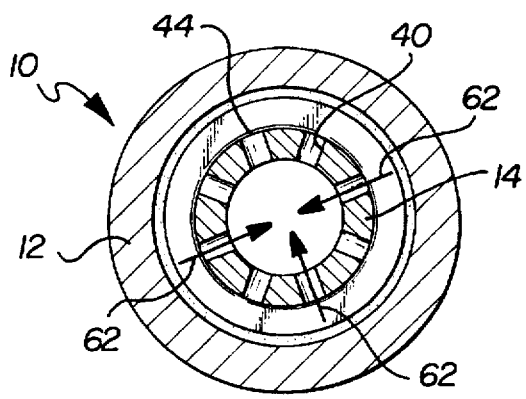
FIG. 3 is sectional view taken along line 3—3 of FIG. 2 showing the inlet ports in the valve member relative to the valve body.

The spool 14 is substantially cylindrical and is of sufficient size to be received within the outlet chamber 24. The spool 14 has an end 32 that is flat and can seat against the shoulder 28 in order to block off all fluid flow into the outlet chamber 24. The spool 14 has an outlet passage 34 that extends substantially the entire length of the spool and runs substantially parallel to a major longitudinal axis 36. Threads 38 are located at one end of the outlet passage 34 for receiving a pipe member (not shown). It will be appreciated the straight or NPT type threads can be used. The other end of the outlet passage 34 has a plurality of radially extending ports 40 that are normal to axis 36. As depicted in FIG. 3, the radially extending ports 40 are preferrably equally spaced apart around the perimeter of recessed area 42. The recessed area 42 is smoothly contoured to minimize fluid turbulence within the high pressure area of the outlet chamber 24. The shape and size of openings 44 of the radial ports 40 can be modified in order to maximize fluid flow. The FIG. 2 valve assembly preferably provides a flow rate of approximately 10 to 60 gallons per minute (GPM) and is operable to perform under pressures reaching 1500 PSI.

Figure 4:
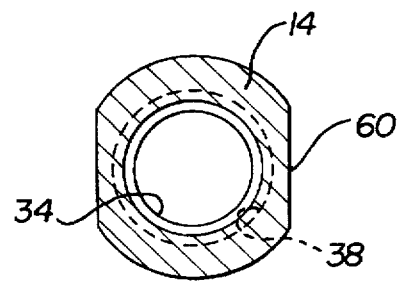
FIG. 4 is a sectional view taken along line 4—4 of FIG. 2 showing the flattened shoulder of the valve member.

A groove 46 is provided within spool 14 in order to accommodate the O-ring 20. Shoulders 48 and 50 are provided on both sides of the O-ring in order to further separate the outlet chamber 24 into a high pressure chamber 52 and a low pressure chamber 54. The spool 14 further has a recess 56 that provides a clearance for the set screw 18. External threads 58 are provided and allow the spool 14 to be threaded into the body 12 which has corresponding female threads 59. The threads 58 also receive jam nut 16 which maintains the adjustment of the valve assembly 10 during operation and especially during high vibration applications. As illustrated in FIG. 4, the end of a spool 14 has a flat or a shoulder 60 for receiving a wrench to assist in adjusting the spool 14 in or out of the body 12.

With continued reference to FIGS. 2 and 3, the operation of the valve assembly 10 will now be described. The fluid enters inlet chamber 22 and follows the path of arrows 62. The fluid is smoothly and evenly distributed around the end 32, all 360 degrees, and then is broken up into discrete streams as the fluid enters the radial ports 40. The fluid then enters the outlet passage 34 where it is then delivered to a pipe (not shown) downstream. To increase the fluid flow rate, the operator can unscrew nut 16 and then rotate the spool 14 counter clockwise or outwardly relative to the body 12 to a predetermined position. This can be accomplished by placing a wrench on the flat shoulder 60 of the spool 14 and on the other flat shoulder 60 of the body 12 and rotating the wrench. The nut 16 can then be tightened against the forward edge 64 of the body. The spool 14 may be backed out to the point of where the screw 18 engages edge 66 of recess 56. This prevents the spool 14 from inadvertently backing out too far and disengaging from the body 12. Also, valve assembly 10 can be adjusted such that the fluid flow rate is zero by rotating the nut 16 counter clockwise and then threading the spool 14 in a clockwise manner until the end 32 rests against shoulder 28. Thus, the valve assembly 10 preferably is infinitely adjustable between 0 to 60 GPM. It will be appreciated that the valve assembly 10 can be modified to produce higher flow rates and different flow ranges.

Figure 5:
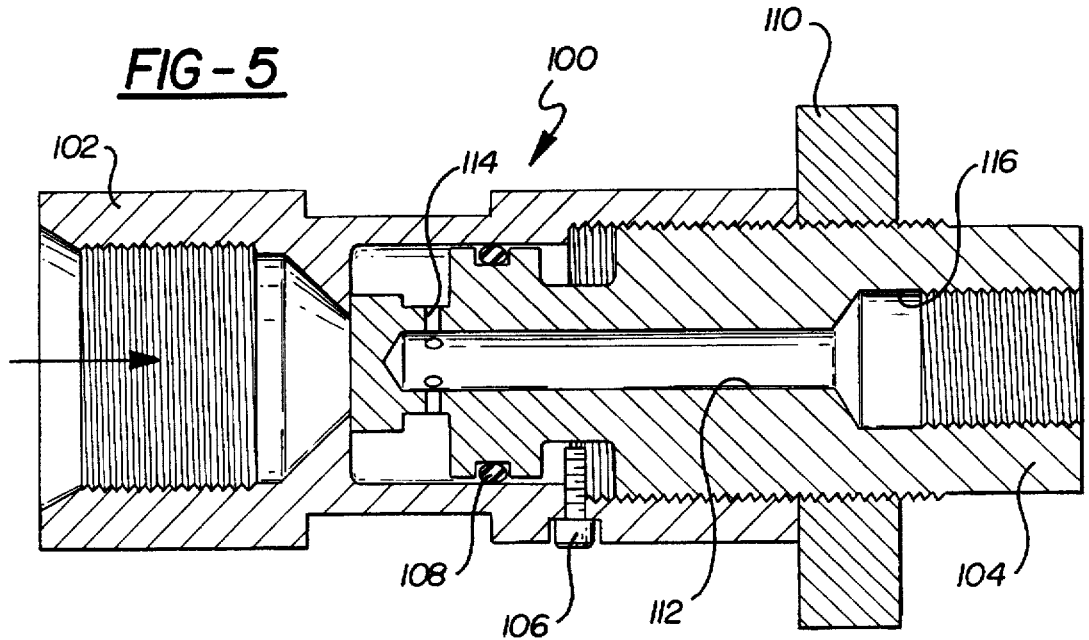
FIG. 5 is an alternative embodiment to the FIG. 2 valve assembly showing the valve member with a reduced internal passageway and the assembly in the closed position.

FIG. 5 represents an alternative embodiment valve assembly 100 that preferably provides a flow rate of 0.5 GPM to 15 GPM. It too can be shut off to produce 0 GPM. The valve assembly 100 has a valve body 102, a spool 104, a set screw 106, an O-ring 108, and a jam nut 110. The body 102, set screw 106, O-ring 108, and jam nut 110 are substantially similar to that described in the FIG. 2 embodiment, and thus, no further discussion will be presented here. The spool 104 has a modified internal passageway 112 that connects a plurality of radially extending ports 114 to an outlet passage 116. The internal passageway 112 is smaller in diameter than the outlet passage 116. Outlet passage 116 is threaded to receive a pipe member (not shown). The radial ports are fewer in number than those disclosed in FIG. 3. The assembly 100 is smaller in configuration in order to accommodate applications where flow rates under approximately 15 GPM are desired. The valve assembly 100 operates in substantially the same manner as the valve assembly 10.

Figure 6:
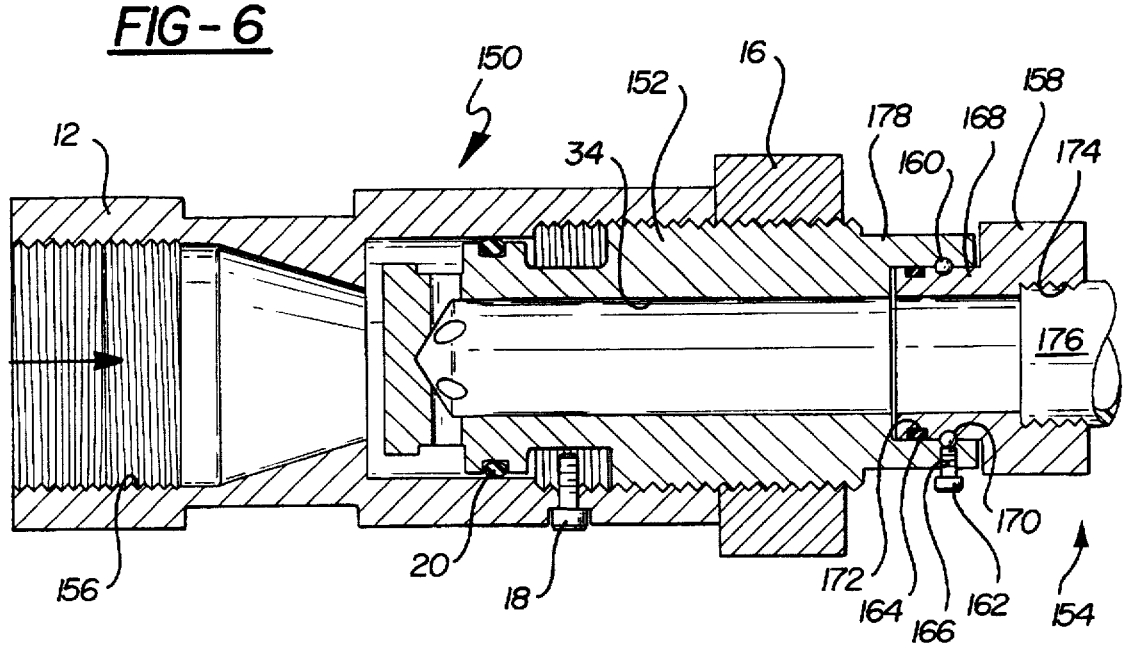
FIG. 6 is another alternative embodiment to the FIG. 2 valve assembly showing a swivel connector connected to the valve member.

FIG. 6 illustrates an alternative valve assembly 150 that uses a swivel connector to minimize torque on the pipes that are connected to the assembly. Where possible, like reference numerals will be used to indicate similar components. The valve assembly 150 is comprised of a body 12, a spool 152, a nut 16, a set screw 18, an O-ring 20, and a swivel connector assembly 154. The valve body 12 is shown with straight threads 156 instead of the NPT type threads depicted in the FIG. 2 embodiment. The swivel connector assembly 154 includes a body 158, bearings 160, a retaining screw 162, and a seal 164. The spool 152 is modified at one end to have a bearing fill port 166 that is sufficiently large in diameter to freely receive the bearings 160. The retaining screw 162 retains the bearings 160 once they have been inserted into the bearing fill port 166. The body 158 has a neck portion 168 that extends within the outlet passage 34 and provides a smooth continuous extension of the outlet passage into the swivel assembly 152 in order to enhance laminar flow. The neck 168 includes a recess 170 for receiving the bearings 160 and another recess 172 is provided for receiving the seal 164. This relationship allows the spool 152 to rotate relative to the swivel connector assembly 154 when an operator adjusts the flow rate and therefore, minimizes stress on the piping connected to the valve assembly. The body 158 has internal threads 174 for receiving pipe 176 which, in turn, can be connected to an apparatus that needs its fluid flow regulated. It is preferred that the valve assemblies be connected downstream from a pump and/or accumulator.

The body and the spool are preferably made of a corrosive resistant material, for example tool steel 4340 and black oxide coated. The assembly is also preferrably made of material having excellent machinability as well as wearability due to the high flow rates and high fluid velocities to which the valve will be subjected. The FIG. 6 embodiment operates in the same manner as discussed in the FIG. 2 embodiment, except for the operation of the swivel connector assembly 154. It will be appreciated that the swivel connector assembly 154 can be modified to adapt to the outer perimeter 178 of the spool 14. It is further contemplated that one skilled in the art would appreciate other mechanisms for connecting a connector to a spool in order to create a swivel connection. The resulting assembly will minimize the stress on the piping downstream and upstream from the valve assembly.

The foregoing discussion discloses and describes merely exemplary embodiments of the present invention. One skilled in the art will readily recognize from such discussion and from the accompanying drawings and the claims, that various changes, modifications, and variations can be made therein without departing from the spirit and scope of the invention as defined in the following claims.

What is claimed is:

1. An adjustable fluid valve assembly comprising:

a body having an inlet chamber and an outlet chamber, the outlet chamber having internal threads located at one end that engage a threaded portion of a spool, the outlet chamber having a shoulder at another end, a shoulder extending substantially normal to a longitudinally extending wall of the outlet chamber, the shoulder defining an opening between the inlet and outlet chambers;

a spool located within the body, the spool having an internal fluid passageway that receives fluid from a plurality of radial ports located at one end of the spool, a groove located adjacent the outlet chamber for receiving an O-ring, a recess adjacent the threaded portion of the spool for receiving one end of a stop member and selectively retaining the spool within the body, and a boss located at said one end of the spool, the shoulder and the boss defining a flow path for high pressurized fluid;

an O-ring positioned within the groove for creating a seal between the spool and the body;

a stop member extending through the body and into the recess of the spool, the stop member being operable to engage the spool and retain the spool within the body;

a retaining member threaded to the spool for maintaining the position of the spool, whereas the valve assembly is operable to be adjusted so that the flow path of high pressurized fluid is closed, and when closed, the boss seats against the shoulder to create substantially zero fluid flow, the zero fluid flow being maintained by then engaging the retaining member against the body.

2. The valve assembly as claimed in claim 1, wherein the inlet chamber of the body has an internal taper for smoothly delivering fluid to the outlet chamber.

3. The valve assembly as claimed in claim 1, wherein the valve assembly is adjustable to produce a flow rate of approximately 10 gallons per minute to approximately 60 gallons per minute.

4. The valve assembly as claimed in claim 1, wherein the valve assembly is adjustable to produce a flow rate of approximately 0.5 gallons per minute to approximately 15 gallons per minute.

5. The valve assembly as claimed in claim 1, wherein each radial port is equally spaced apart around a perimeter of the spool to provide a balanced flow of fluid to the outlet passage of the spool.

6. The valve assembly as claimed in claim 1, wherein the O-ring and the body together separate a high pressure cavity from a low pressure cavity within the outlet chamber.

7. The valve assembly as claimed in claim 1, wherein the spool has a flattened area operable to assist in adjusting the spool relative to the body.

8. The valve assembly as claimed in claim 1, further comprising a swivel connector that is pivotally connected to the spool, the swivel connector having a threaded end for receiving a pipe and an extended end that is received within the outlet passage of the spool.

9. The valve assembly as claimed in claim 8, wherein the spool has a fill port operable to receive bearings that are disposed between the extended end of the connector and the spool.

10. An adjustable fluid valve assembly for controlling the flow of fluid through a member comprising:

a valve body having a first chamber and a second chamber;

a cartridge positionable within the valve body, the cartridge having a longitudinally extending internal passage and an inlet port extending radially from the internal passage;

a flow path of high velocity fluid extending between the first chamber and the inlet port;

an elastomeric member substantially surrounding the cartridge and located downstream from the inlet port and out of the flow path of high velocity fluid;

a stop securable to the valve body for retaining the cartridge within the valve body; and a nut threaded to the cartridge for maintaining the position of the cartridge relative to the valve body when the nut is tightened against the valve body once a position has been selected.

11. The valve assembly as claimed in claim 10, further comprising a plurality of inlet ports equally spaced apart around a perimeter of the cartridge.

12. The valve assembly as claimed in claim 10, wherein the cartridge valve member has a groove located downstream from the inlet port, the groove being operable to receive the elastomeric member.

13. The valve assembly as claimed in claim 10, further comprising a connector connected to one end of the cartridge.

14. The valve assembly as claimed in claim 13, wherein the connector is pivotally connected to the cartridge.

15. The valve assembly as claimed in claim 13, wherein one end of the connector is adapted to receive a pipe and the other end of the connector has bearing members to allow the connector to swivel relative to the cartridge.

16. The valve assembly as claimed in claim 13, further comprising a seal located between the connector and the cartridge.

17. The valve assembly as claimed in claim 10, wherein the longitudinally extending internal passage includes a smaller passageway and an enlarged passageway that is threaded to receive a pipe.

18. A fluid valve comprising:

a valve body having a first chamber and a second chamber;

a valve member positionable within the valve body, the valve member having an internal passage and an inlet port extending from the internal passage;

an elastomeric member substantially surrounding the valve member;

a stop securable to the valve body;

a jam nut threaded to the valve member; and a swivel member pivotally connected to the valve member, the swivel member operable to freely rotate 360 degrees relative to the valve body and reduce the stress on piping that is connected to the swivel member and valve body.

19. The valve as claimed in claim 18, wherein the swivel member has bearing means for pivotally connecting the swivel member to the valve member and further has a seal located between the swivel member and the valve member.

20. The valve as claimed in claim 18, wherein the valve member has a plurality of inlet ports that are equally spaced apart around a perimeter of the valve member to deliver a balanced flow of fluid to the internal passage.

* * * * *